United States Patent [19]
Yokoyama et al.

[11] 3,930,038

[45] Dec. 30, 1975

[54] METHOD FOR COLORING FRUITS AND VEGETABLES

[75] Inventors: Henry Yokoyama; Wan-Jean Hsu, both of Pasadena; Stephen M. Poling, Seal Beach, all of Calif.

[73] Assignee: The United States of America as represented by the Secretary of Agriculture, Washington, D.C.

[22] Filed: Oct. 9, 1974

[21] Appl. No.: 513,360

Related U.S. Application Data

[62] Division of Ser. No. 404,980, Oct. 10, 1973, Pat. No. 3,864,501.

[52] U.S. Cl. ............... 426/269; 426/252; 426/270; 426/308; 71/98; 424/344
[51] Int. Cl.² .......................................... A23L 1/272
[58] Field of Search .......... 426/102, 177, 206, 250, 426/252, 262, 268, 269, 270, 308, 311, 377, 379; 71/98, 108, 111, 121; 117/3; 424/344; 260/468 R, 468 K, 468 L, 472, 573, 576, 583 EE, 584 R, 584 C, 584 A, 590, 592, 600, 609 R

[56] References Cited
UNITED STATES PATENTS

| | | | |
|---|---|---|---|
| 3,287,101 | 11/1966 | Curtis et al. ............................ | 71/98 |
| 3,684,530 | 8/1972 | Yokoyama .......................... | 426/268 |
| 3,776,714 | 12/1973 | Bordenca ............................. | 71/121 |
| 3,833,350 | 9/1974 | Cooke et al. ....................... | 426/268 |

OTHER PUBLICATIONS

Chemical Abstracts, Vol. 76, 1972, 10703q.

*Primary Examiner*—Norman Yudkoff
*Assistant Examiner*—Curtis P. Ribando
*Attorney, Agent, or Firm*—M. Howard Silverstein; W. Takacs

[57] ABSTRACT

The color of fruits and vegetables is enhanced by applying thereto a compound which has the ability to cause the accumulation of lycopene in the tissues of the treated produce. Examples of compounds used in accordance with the invention are:

4-[β-(diethylamino)-ethoxy]-benzaldehyde
4-[β-(diethylamino)-ethoxy]-benzene
N,N-diethyl-ethanolamine
β-(diethylamino)ethyl anisolate
N,N-diethyl-phenylpropylamine

3 Claims, No Drawings

METHOD FOR COLORING FRUITS AND VEGETABLES

This is a division of our copending application Ser. No. 404,980, filed Oct. 10, 1973, now U.S. Pat. No. 3,864,501.

DEFINITIONS

Various symbols used in this document are defined as follows:

The abbreviations "Et" and "Me" refer to ethyl and methyl, respectively.

"Lower alkyl" means an alkyl radical containing 1 to 4 carbon atoms. Similarly, "lower alkoxy" means an alkoxy radical having 1 to 4 carbon atoms.

The symbol "Ph" designates the phenyl radical. The phenylene radical ($-C_6H_4-$) is depicted by the symbol $-\phi-$. Where particular positions of substituents are involved, this is designated by appropriate numbers. Thus —

indicates that the substituents are at the 1,4 positions, i.e., para to one another.

DESCRIPTION OF THE INVENTION

This invention relates to and has among its objects the provision of novel processes for coloring fruits and vegetables.

Further objects of the invention will be evident from the following description wherein parts and percentages are by weight unless otherwise specified.

In the following description, the application of the invention to citrus fruits is stressed. It is to be understood that this particular embodiment of the invention is provided by way of illustration and not limitation. In its broad ambit, the invention is applicable to all kinds of fruits and vegetables which contain carotenogenic tissues, that is, tissues which produce carotenoid pigments. Illustrative examples of such fruits and vegetables are apricots, peaches, cherries, nectarines, tomatoes, bell peppers, chili peppers, carrots, sweet potatoes, etc., as well as oranges, lemons, tangerines, grapefruit, and other citrus fruits.

It is well-known that one factor which influences the market value of fruits and vegetables is the color thereof. It often happens that when fruits and vegetables are received at the packing house, their color is deficient even though they are entirely ripe and in excellent condition. This is particularly true with citrus fruit in which case, owing to vagaries in the weather, position of the fruit on the tree, etc, the harvested fruit is often pale or non-uniform in color despite the fact that it is physiologically mature.

A principle object of the invention is to obviate the problem outlined above. The invention provides the means whereby the color of harvested fruits and vegetables can be improved, for example, oranges or tangerines which are yellow or greenish can be provided with a rich orange color.

Basically, the objects of the invention are attained by applying to the whole harvested fruit or vegetables any of the components described below.

Group I. Compounds of the structure

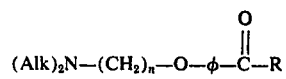

wherein:
Alk is lower alkyl, preferably methyl or ethyl.
$n$ is an integer from 2 to 4.
R is a mamber of the group consisting of H, lower alkyl, phenyl, $-CH=CH-Ph$, and $-CH_2-CH_2-Ph$.

Group II. Compounds of the structure

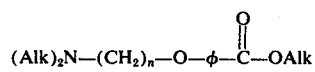

wherein:
Alk is lower alkyl, preferably methyl or ethyl.
$n$ is an integer from 2 to 4.

Group III. Compounds of the structure $$(Alk)_2N-(CH_2)_n-O-\phi-R'$$

wherein:
Alk is lower alkyl, preferably methyl or ethyl.
$n$ is an integer from 2 to 4.
R' is a member of the group consisting of H, —OH, lower alkyl, and lower alkoxy.

Group IV. Compounds of the structure $$(Alk)_2N-(CH_2)_n-OH$$

wherein:
Alk is lower alkyl, preferably methyl or ethyl.
$n$ is an integer from 2 to 4.

Group V. Compounds of the structure

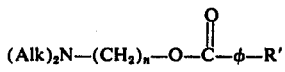

wherein:
Alk is lower alkyl, preferably methyl or ethyl.
$n$ is an integer from 2 to 4.
R' is a member of the group consisting of H, —OH, lower alkyl, and lower alkoxy.

Group VI. Compounds of the structure $$(Alk)_2N-(CH_2)_m-\phi-R'$$

wherein:
Alk is lower alkyl, preferably methyl or ethyl.
$m$ is an integer from 1 to 5.
R' is a member of the group consisting of H, —OH, lower alkyl, and lower alkoxy.

Group VII. Compounds of the structure $$(Alk)_2N-(CH_2)_x-CH_3$$

wherein:
Alk is lower alkyl, preferably methyl or ethyl.
$x$ is an integer from 3 to 7.

Group VIII. Compounds of the structure $$(Alk)_2N-(CH_2)_n-S-R''$$

wherein:
Alk is lower alkyl, preferably methyl or ethyl.
$n$ is an integer from 2 to 4. R'' is a member of the group consisting of H, lower alkyl, and phenyl.

The compounds of the invention operate not by any dyeing effect (they are themselves essentially colorless), but by inducing the selective accumulation of lycopene as the predominant pigment in the carotenogenic tissue. Lycopene is the natural red coloring principle of the tomato, and its accumulation in the tissue causes an intensification of the color of the treated fruit or vegetable. Depending on the amount of lycopene formed, the treated produce will assume an orange or even a red color.

Contributing to the color enhancement obtained in the process of the invention is that the applied compounds also increase the production (in the treated tissue) of provitamins A, including $\alpha$-, $\beta$-, and especially $\gamma$-carotene.

Since the compounds of the invention are effective in very small amounts, they are most conveniently applied in conjunction with an inert carrier such as water, ethanol, isopropanol, or wax. A typical plan for carrying out the treatment of the invention is to dip the fruit or vegetable in an aqueous or isopropanol solution containing a small proportion—for example, about 0.1 to 10%—of any of the compounds described above. It is, of course, not essential to apply the solution by dipping; it can be applied by spraying, flooding, or the like.

Since many fruits and vegetables have a natural waxy outer coating which is water-repellent it is preferred that the treating solution contain a wetting agent so that the solution can uniformly coat the entire surface of the fruit or vegetable. For this purpose one may use any conventional surfactant such as soaps, sodium alkyl ($C_8$—$C_{18}$) sulphates, sodium alkand ($C_6$—$C_{18}$) sulphonates, sodium alkyl ($C_8$—$C_{20}$) benzene sulphonates, esters of sulphosuccinic acid such as sodium dioctylsulphosuccinate, etc. Wetting and dispersing agents of the non-ionic type are suitable, for example, the reaction products of ehtylene or propylene oxide with fatty acids, with polyhydric alcohols, with partial esters of fatty acids and polyhydric alcohols, or with alkyl phenols, etc. Typical of such agents are a polyoxyethylene stearate containing about 20 oxyethylene groups per mole, a polyoxyethylene ether of sorbitan monolaurate containing about 16 oxyethylene groups per mole, a distearate of polyoxyethylene ether of sorbitol containing about 40 oxyethylene groups per mole, iso-octylphenyl ether of polyethylene glycol, etc. Generally, only a small proportion of surfactant is used--on the order of 0.05 to 0.5%, based on the weight of solution. In addition to, or in place of the surfactant, a supplementary solvent may be added to the primary solvent (water) in quantity sufficient to disperse the active agent. For such purpose one may use ethanol, isopropanol, or other inert volatile solvent, particularly one which is at least partly miscible with water. It is evident that the solutions need not necessarily be true solutions; they may be colloidal solutions, emulsions, or suspensions, all of these being considered as solutions for the purposes of the invention.

It may also be observed that some of the compounds of the invention—those with long alkyl chains—exhibit emulsifying activity and can be used in aqueous solution without any added wetting agent.

In the event that the compounds of the invention are applied in a wax carrier, one may use for the purpose any wax, including hydrocarbon waxes such as paraffin or microcrystalline petroleum wax; beeswax; carnauba wax; spermaceti; etc. The preparation will generally contain about 0.1 to 10% of any of the compounds described above, and may be applied in various ways. One technique is to liquefy the preparation by warming it and then applying it to the fruit or vegetable by dipping or spraying. Another plan is to dissolve the wax-containing preparation in an inert volatile solvent such as hexane, octane, stoddard solvent, deodorized kerosene, or other volatile petroleum fraction and apply the resulting solution by spraying or dipping to the produce.

The action of the compounds is not immediate; the development of color requires some time for chemical reactions to take place within the tissue. Accordingly, after the step of applying the compound, the treated produce is held so that the desired coloration will develop. The temperature at which the holding is conducted may vary—for example, from about 15° to about 35° C.— and influences the rate of coloration in that color enhancement will take place more rapidly at the higher temperatures, and vice versa. Usually, for convenience it is preferred to conduct the holding at room temperature. Regardless of the temperature used, the treated fruit or vegetable should have access to air during the holding period so that it can respire and remain in a vital condition. The time required for color development in any particular case will vary depending on several factors including the type of fruit or vegetable, the particular compound used and the amount applied, the temperature during the holding period, the degree of color enhancement desired, etc. In many cases, excellent color development is obtained where treated citrus fruits are held for about 12–72 hours at ambient temperature.

When the desired color level has been attained, the fruit or vegetable may be stored at conventional cold storage temperature (about 5°-10° C.) intil it is to be used. At such temperatures the established color is retained, and further color development is retarded. Storage under such conditions can be applied for periods of up to 2 or 3 months without excessive deepening of color or deterioration of the fruit or vegetable.

Since the enhancement of color in accordance with the invention involves the biosynthesis of lycopene within the fruit or vegetable tissue, it is obvious that the product to which the invention is applied be in a fresh condition, i.e., in a physiologically-active state so that it is capable of respiring and undergoing normal post-harvest metabolic changes.

Where the compounds of the invention are applied to the surface of fruits or vegtables, the coloration enhancement will take place in the peel or rind of the treated product. If deeper color enhancement is desired such as coloration of the flesh together with coloration of the peel, the compounds are applied in such a way that they penetrate through the peel. This can be done by vacuum infiltration. Thus the fruit or vegetable is placed in a vessel with an excess of a solution containing a compound of the invention. The vessel is sealed and a vacuum is applied and then released. This causes the solution to permeate the peel to the flesh within. The treated product is then stored as described to develop the desired coloration.

Hereinabove we have stressed the application of the invention for the purpose of enhancing the color of fruits and vegetables. Another phase of the invention is concerned with the preparation of carotenoid pigments which may be used for coloring food products of all kinds. A special advantage of these carotenoid pigments is that they are natural constituents of fruits and vegetables and thus can be safely used in foods. In practicing this phase of the invention, fruits or vegetables, or parts thereof are treated with any of the compounds described above and stored to develop substantial increase in color. The so-formed carotenoid pigments are then isolated from the treated substrate by conventional means such as pressing or extraction with a solvent. In a preferred embodiment of this aspect of the invention, the procedure is applied to the peels of oranges, lemons, grapefruit or other citrus fruit which are obtainable as waste from food processing plants. The peels are coated by spraying or dipping with an aqueous solution containing about 0.1 to 10% of any of the color-enhancing compounds herein described. Preferably, to attain good contact of the solution with the peels, a small proportion of a wetting agent is incorporated therein. Also to retard mold growth or other microbial deterioration, it is preferred that the solution contain a small proportion—for example, about 0.05 to 0.1%—of a preservative such as sodium benzoate, sodium sorbate, or the lower alkyl esters of parahydroxybenzoic acid. The peels are then allowed to stand at room temperature for several days (usually about a week) until a strong color enhancement is attained. It is of course obvious that since the development of carotenoids is based on biochemical changes, the peel to which the process is applied should be in a fresh condition so that it constitutes a viable living system capable of further carotenoid biosynthesis. Also the peel should be exposed to air during the storage period so that respiration can take place. Following completion of the storage period, the peels are treated as by pressing or extraction to recover the carotenoid pigments therefrom. Preferably the treated peel is extracted with a mixture of equal volumes of isopropanol and acetone. The extract is then treated to evaporate the solvent, leaving as a residue the desired product—a mixture of carotenoid pigments which will generally contain lycopene as the principal pigment.

The invention is further demonstrated by the following illustrative example.

The compounds used in this example had the structure $$Et_2N-(CH_2)_n-S-R''$$

wherein $n$ and $R''$ are as follows:

| Compound A: | $n$ is 2, $R''$ is —Ph |
| Compound B: | $n$ is 2, $R''$ is —Et |
| Compound C: | $n$ is 2, $R''$ is —H |
| Compound D: | $n$ is 3, $R''$ is —H |

Fruits or vegetables were dipped in or sprayed with 1–5% (w/v) solutions of the compounds in isopropanol, and then stored at about 20°–22° C. for varying periods of time depending on the color desired.

Marsh seedless grapefruit treated with 5% solutions of Compounds A or B developed visible color enhancement (light orange) overnight. After a week the fruit attained a deeper orange color and this color persisted for another 2 weeks, after which the fruit turned light red. Compounds A, B, and C did not produce the amount of lycopene attained with many other of the compounds of the invention—the usual amount of lycopene was about 150 μg/g dry weight of peel. It was also observed that Compound C was much less effective than Compounds A or B.

Marsh seedless grapefruit treated with 5% of Compound D exhibited a light pink color after 2–3 days, and the fruit attained a light red color after 3 weeks.

PREPARATION OF THE COMPOUNDS

Some of the compounds used in accordance with the invention are available in commerce. Among these are 4-[β-(diethylamino)-ethoxy] benzaldehyde, N,N-diethylethanolamine, 2-diethylaminoethanethiol, and the N,N-diethylalkylamines. The compounds can also be prepared by known procedures, exemplified as follows:

Group VIII: The compounds of this group can be prepared by the scheme given below, wherein Alk is lower alkyl, $n$ is an integer from 2 to 4, and $R''$ is a member of the group consisting of H, lower alkyl, and phenyl.

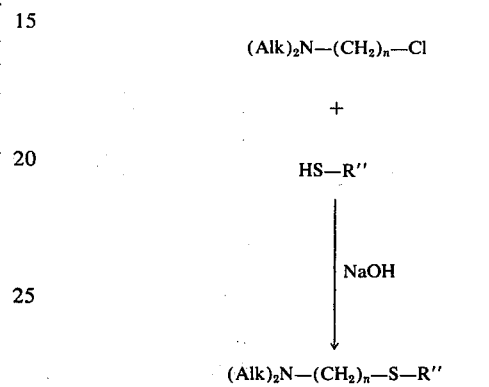

Details on this synthesis are in the article by Schuetz and Baldwin, Jour. Amer. Chem. Soc., Vol. 80, pp. 162–164 (1958).

The following plan is preferred where $R''$ is hydrogen:

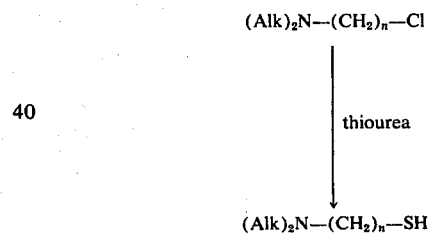

Details of this synthesis are provided by Albertson and Clinton, Jour. Am. Chem. Soc., Vol. 67, p. 1222 (1945).

What is claimed is:

1. A process for enhancing the coloration of harvested fruits and vegetables which contain carotenogenic tissue, which comprises —
   a. applying to the surface of the harvested fruit or vegetable a compound of the structure $$Et_2N-CH_2-CH_2-S-Et$$

b. and holding the fruit or vegetable for a period long enough to develop an enhanced coloration.

2. A process for enhancing the coloration of harvested fruits and vegetables which contain carotenogenic tissue, which comprises —
   a. applying to the surface of the harvested fruit or vegetable a compound of the structure $$Et_2N-CH_2-C_2-SH$$

b. and holding the fruit or vegetable for a period long enough to develop an enhanced coloration.

3. A process for enhancing the coloration of harvested fruits and vegetables which contain carotenogenic tissue, which comprises —
   a. applying to the surface of the harvested fruit or vegetable a compound of the structure $$Et_2N-(CH_2)_3-SH$$

b. and holding the fruit or vegetable for a period long enough to develop an enhanced coloration.